United States Patent
Shindo et al.

(10) Patent No.: US 7,557,165 B2
(45) Date of Patent: Jul. 7, 2009

(54) RUBBER MOLDING PRODUCT FOR GOLF BALL, ITS MAKING METHOD AND GOLF BALL

(75) Inventors: Jun Shindo, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 431 days.

(21) Appl. No.: 11/353,109

(22) Filed: Feb. 14, 2006

(65) Prior Publication Data

US 2007/0191550 A1    Aug. 16, 2007

(51) Int. Cl.
*C08L 9/00*    (2006.01)
*A63B 37/06*   (2006.01)

(52) U.S. Cl. .................. 525/256; 525/259; 525/261; 525/274; 473/371; 473/372

(58) Field of Classification Search .............. None
See application file for complete search history.

(56) References Cited

U.S. PATENT DOCUMENTS

| | | | |
|---|---|---|---|
| 6,315,684 B1 * | 11/2001 | Binette et al. ............. | 473/377 |
| 6,695,718 B2 | 2/2004 | Nesbitt | |
| 6,767,940 B2 | 7/2004 | Voorheis et al. | |
| 6,818,705 B2 * | 11/2004 | Wu et al. ................... | 525/261 |
| 6,878,075 B2 | 4/2005 | Kim | |
| 2005/0079930 A1 * | 4/2005 | Higuchi et al. ............. | 473/371 |
| 2008/0020864 A1 * | 1/2008 | Shindo et al. .............. | 473/373 |

OTHER PUBLICATIONS

Thain, Science and Golf IV; Jul. 2002, p. 319-327.*
Mason et al., "Hydrolysis of Tri-*tert*-butylaluminum: The First Structural Characterization of Alkylalumoxanes $[(R_2Al)_2O]_n$ and $(RAlO)_n$", American Chemical Society; 1993, pp. 4971-4984, *J. Am. Chem. Soc.*
Harlan et al., "Three-Coordinate Aluminum Is Not a Prerequisite for Catalytic Activity in the Zirconocene-Alumoxane Polymerization of Ethylene", American Chemical Society, 1995, pp. 6465-6474, *J. Am. Chem. Soc.*.
Fine Chemical, 23, (9), 5 (1994).

* cited by examiner

*Primary Examiner*—David Buttner
(74) *Attorney, Agent, or Firm*—Sughrue Mion, PLLC

(57) ABSTRACT

A molded rubber material for golf balls which is obtained by molding and curing a rubber compound composed of base rubber and such ingredients as crosslinking agent, co-crosslinking agent, and vulcanization accelerator, wherein the base rubber is polybutadiene which results from polymerization with the help of a catalyst of rare earth element and has a stress relaxation time ($T_{80}$) no longer than 5 (measured according to ASTM D 1646-96), the vulcanization accelerator is hexamethylenetetramine, and the rubber compound contains an organosulfur compound. A method for producing the molded rubber material, and a golf ball having the molded rubber material as the solid core. The method permits efficient production of high-quality rubber molded material with high rebound resilience.

9 Claims, No Drawings

RUBBER MOLDING PRODUCT FOR GOLF BALL, ITS MAKING METHOD AND GOLF BALL

BACKGROUND OF THE INVENTION

The present invention relates to a molded rubber material for golf balls, which is used as a constituent of a golf ball. Particularly, the present invention relates to a spherical molded rubber material to be used as the core of solid golf balls, such as two-piece or three-piece golf balls. More particularly, the present invention relates to a high-quality hard molded rubber material for golf balls, a method for producing the molded rubber material efficiently, and a golf ball.

A solid golf ball has a core which accounts for its major portion; therefore, it depends largely on its core for its quality. Consequently, attempts have been made to develop a new core with higher hardness and better hardness distribution, which impart improved rebound resilience to golf balls. In other words, there is a demand for a molded rubber material for golf balls with high rebound resilience.

For the development of golf balls with high rebound resilience, there have been proposed several technologies of incorporating a rubber compound with an organic sulfur compound in an adequate amount. These technologies improve the rebound resilience of the core but take a longer time for vulcanization (or reaction), with the productivity of cores decreasing.

Incorporation with a vulcanization accelerator is a common practice for accelerating the reaction of rubber with a vulcanizing agent, as disclosed in the following patents.

U.S. Pat. No. 6,878,075
U.S. Pat. No. 6,767,940
U.S. Pat. No. 6,695,718

Unfortunately, incorporation of a vulcanization accelerator into a rubber compound adversely affects the rebound resilience of molded material. Thus, there is a demand for a core material which can be vulcanized efficiently without any adverse effect on rebound resilience.

SUMMARY OF THE INVENTION

The present invention was completed in view of the foregoing. It is an object of the present invention to provide a molded rubber material with high rebound resilience, a method for efficient production thereof, and a golf ball having the molded rubber material as the core.

In order to achieve the above-mentioned object, the present inventors carried out a series of researches, which led to the finding that it is possible to efficiently produce cores with high rebound resilience if a specific vulcanization accelerator is incorporated into a rubber compound composed of a specific polybutadiene and an organosulfur compound. To be concrete, the polybutadiene is one which has a stress relaxation time ($T_{80}$) no longer than 5 and which is polymerized with the help of a catalyst of rare earth element, and the vulcanization accelerator is hexamethylenetetramine. The rubber compound specified above is capable of rapid crosslinking for molding and the resulting molded material (as a core) has high rebound resilience. The present invention is based on this finding.

It is an object of the present invention to provide a molded rubber material for golf balls, a method for production thereof, and a golf ball, which are defined in the following.

[1] molded rubber material for golf balls which is obtained by molding and curing a rubber compound composed of base rubber and such ingredients as crosslinking agent, co-crosslinking agent, and vulcanization accelerator, wherein the base rubber is polybutadiene which results from polymerization with the help of a catalyst of rare earth element and has a stress relaxation time ($T_{80}$) no longer than 5 (measured according to ASTM D 1646-96), the vulcanization accelerator is hexamethylenetetramine, and the rubber compound contains an organosulfur compound.

[2] The molded rubber material for golf balls as defined in paragraph [1] above, wherein the polybutadiene accounts for no less than 50% by weight in base rubber.

[3] The molded rubber material for golf balls as defined in paragraph [1] above, wherein the catalyst of rare earth element is a neodymium-based catalyst.

[4] The molded rubber material for golf balls as defined in paragraph [1] above, wherein the hexamethylenetetramine accounts for no less than 0.01 pbw in 100 pbw of the base rubber.

[5] The molded rubber material for golf balls as defined in paragraph [1] above, which is a spherical body measuring 30 to 42.7 mm in diameter and being subject to flex deformation of 2.0 to 7.0 mm under a load increasing from 98 N (10 kgf) to 1275 N (130 kgf).

[6] A golf ball including one or more cover layers and a solid core enclosed therein, wherein the solid core is the molded rubber material as defined in paragraph [1] above.

[7] A method for producing a molded rubber material for golf balls by molding and curing a rubber compound composed of base rubber and such ingredients as crosslinking agent, co-crosslinking agent, and vulcanization accelerator, wherein the base rubber is polybutadiene which results from polymerization with the help of a catalyst of rare earth element and has a stress relaxation time ($T_{80}$) no longer than 5 (measured according to ASTM D 1646-96), the vulcanization accelerator is hexamethylenetetramine, and the rubber compound contains an organosulfur compound.

DETAILED DESCRIPTION OF THE PREFERRED EMBODIMENTS

The present invention covers a molded rubber material which is obtained by molding and curing a rubber compound composed of base rubber and such ingredients as crosslinking agent, co-crosslinking agent, vulcanization accelerator, and organosulfur compound. The composition of the rubber compound will be described in the following.

Base Rubber

The base rubber used in the present invention is a polybutadiene which results from polymerization with the help of a catalyst of rare earth element. The polybutadiene is characterized by its high content of cis-1,4-linkage, which should be no less than 60%, preferably no less than 80%, more preferably no less than 90%, and most desirably no less than 95%.

The polybutadiene resulting from polymerization with the help of a catalyst of rare earth element should account for no less than 50 wt %, preferably no less than 60 wt %, and most desirably 100 wt %, in the base rubber.

The base rubber may be compounded with optional ingredients such as natural rubber, polyisoprene rubber, styrene-butadiene rubber, ethylene-propylene-diene rubber, silicone rubber, and modified products thereof.

The catalyst of rare earth element may be selected from any known ones, such as catalysts derived from lanthanum rare earth element compounds, organoaluminum compounds, aluminoxane, and halogen-containing compounds. It may optionally be used in combination with a Lewis base.

The lanthanum rare earth element compounds mentioned above include metals of atomic numbers 57 to 71 in the form of halide, carboxylate, alcoholate, thioalcoholate, amide or the like.

The organoaluminum compound mentioned above may be the one which is represented by $AlR^1R^2R^3$ (where $R^1$, $R^2$, and $R^3$ may be identical or different, each denoting a hydrogen atom or C1 to 8 hydrocarbon residue).

The alumoxane mentioned above includes those compounds represented by the formula (I) or (II) below. It may also be an association compound of alumoxane, which is disclosed in Fine Chemical, 23, (9), 5 (1994), J. Am. Chem. Soc., 115, 4971 (1993), and J. Am. Chem. Soc., 117, 6465 (1995).

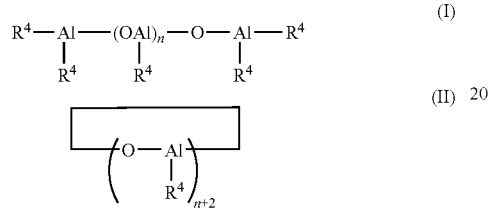

(where $R^4$ denotes a C1 to 20 hydrocarbon group, and n is an integer of 2 or above.)

The halogen-containing compound includes aluminum halide represented by $AlX_nR_{3-n}$ (where X denotes a halogen, R denotes a C1 to 20 hydrocarbon residue, such as alkyl group, aryl group, and aralkyl group, and n denotes 1, 1.5, 2, or 3) and strontium halide such as $Me_3SrCl$, $Me_2SrCl_2$, $MeSrHCl_2$, and $MeSrCl_3$. It also includes metal halides such as silicon tetrachloride, tin tetrachloride, and titanium tetrachloride.

The Lewis base may be used to complex the lanthanum rare earth element compounds. It includes, for example, acetylacetone and ketone alcohol.

According to the present invention, it is desirable to use a neodymium-based catalyst in which the lanthanum rare earth element compound is a neodymium compound, because this catalyst yields polybutadiene rubber with a high content of 1,4-cis linkage and a low content of 1,2-vinyl linkage. A typical example of the rare earth element catalyst is disclosed in Japanese Patent Laid-open No. Hei 11-35633.

Bulk polymerization or gas-phase polymerization with or without solvent may be used to produce polybutadiene with the help of a catalyst of rare earth element. The polymerization temperature is usually −30° C. to 150° C., preferably 10° C. to 100° C.

The polybutadiene mentioned above may be one which has its active end groups modified after polymerization carried out as mentioned above with the help of a catalyst of rare earth element.

Any known end group modifiers may be used for this purpose. They include the following compounds (i) to (vi).

(i) Halogenated organometallic compounds, halogenated metallic compounds, and organometallic compounds, which are represented by any of $R^5{}_nM'X_{4-n}$, $M'X_4$, $M'X_3$, $R^5{}_nM'(-R^6-COOR^7)_{4-n}$, and $R^5{}_nM'(-R^6-COR^7)_{4-n}$ (where $R^5$ and $R^6$ are identical or different C1 to 20 hydrocarbon groups; $R^7$ is a C1 to 20 hydrocarbon group, with or without carbonyl groups or ester groups in the side chain; M' denotes any of tin atom, silicon atom, germanium atom, and phosphorus atom; X denotes a halogen atom; and n denotes an integer of 0 to 3).

(ii) Heterocumulene compounds having the Y=C=Z bond in the molecule (where Y denotes any of carbon atom, oxygen atom, nitrogen atom, and sulfur atom, and Z denotes any of oxygen atom, nitrogen atom, and sulfur atom).

(iii) Hetero-three-membered ring compounds having the following bond in the molecule.

(where Y denotes any of oxygen atom, nitrogen atom, and sulfur atom).

(iv) Halogenated isocyano compounds.

(v) Any of carboxylic acid, acid halide, ester compound, carbonate ester compound, and acid anhydride, which are represented by any of $R^8-(COOH)_m$, $R^9(COX)_m$, $R^{10}-(COO-R^{11})$, $R^{12}-OCOO-R^{13}$, $R^{14}-(COOCO-R^{15})_m$, and the following formula.

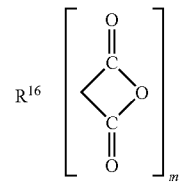

(where $R^8$ to $R^{16}$ denote identical or different C1 to 50 hydrocarbon groups; X denotes a halogen atom; and m denotes an integer of 1 to 5).

(vi) Metal salt of carboxylic acid represented by any of $R^{17}{}_lM'''(OCOR^{18})_{4-l}$, $R^{19}{}_lM'''(OCO-R^{20}-COOR^{21})_{4-l}$, and the following formula.

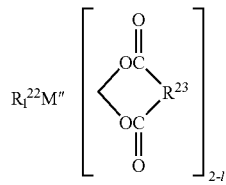

(where $R^{17}$ to $R^{23}$ denote identical or different C1 to 20 hydrocarbon groups; M''' denotes any of tin atom, silicon atom, and germanium atom; and l denotes an integer of 0 to 3).

The end group modifiers listed in (i) to (vi) above are mentioned with reference to their examples and reactions in Japanese Patent Laid-open Nos. Hei 11-35633 and Hei 7-268132.

The polybutadiene mentioned above should have a Mooney viscosity ($ML_{1+4}(100°$ C.)) which is no lower than 20, preferably no lower than 30, and no higher than 80, preferably no higher than 70, more preferably no higher than 65.

The Mooney viscosity is an industrial index of viscosity measured by means of a Mooney viscometer, which is a kind of rotary plastometer. It is expressed with a unit symbol of $ML_{1+4}(100°$ C.), where M stands for Mooney viscosity, L stands for a large rotor (L type), 1+4 stands for one minute of preliminary heating and four minutes of rotor rotation, and 100° C. stands for the temperature of measurement. It is measured according to ASTM D-1646-96.

The polybutadiene used in the present invention should preferably be one which has a stress relaxation time ($T_{80}$) no longer than five, preferably no longer than four, as defined below.

[The Stress Relaxation Time ($T_{80}$)]

The stress relaxation time ($T_{80}$) is defined as time (in seconds) required for the sample to decrease in Mooney viscosity by 80% after the rotor has come to rest as soon as measurement is complete. Mooney viscosity $ML_{1+4}(100°\ C.)$ is measured according to ASTM D-1646-96.

Polybutadiene rubber with a stress relaxation time ($T_{80}$) longer than five will be poor in rebound resilience after crosslinking or will be slow in crosslinking.

Typical examples of commercially available polybutadiene rubber include "EC140" from The Firestone Polymer Company and "BR700" from JSR Corporation.

Co-Crosslinking Agent

The co-crosslinking agent may be selected from unsaturated carboxylic acids and/or metal salts thereof.

Unsaturated carboxylic acids are exemplified by acrylic acid, methacrylic acid, maleic acid, and fumaric acid. Of these examples, acrylic acid and methacrylic acid are preferable.

Metal salts of unsaturated carboxylic acids are exemplified by zinc salts and magnesium salts of unsaturated fatty acids, such as zinc acrylate and zinc methacrylate. Of these examples, zinc acrylate is preferable.

The base rubber (100 parts by weight (pbw)) should be incorporated with the unsaturated carboxylic acid and/or metal salt thereof in an amount no less than 10 pbw, preferably no less than 15 pbw, more preferably no less than 20 pbw, and no more than 60 pbw, preferably no more than 50 pbw, more preferably no more than 45 pbw, most desirably no more than 40 pbw. The resulting rubber compound will be excessively hard or poor in rebound resilience if the amount is more or less than specified, respectively.

Crosslinking Agent

The crosslinking agent is exemplified by organic peroxide, sulfur, metal oxide, organic polyamine compound, and modified phenolic resin. Of these examples, organic peroxides are preferable. They function also as a polymerization initiator.

The organic peroxide may be selected from commercial ones, such as "Percumyl D", "Perhexa C" (both from NOF CORPORATION), and Luperco 231XL (from Atochem). Two or more species of organic peroxide may be used according to need.

The base rubber (100 pbw) should be incorporated with an organic peroxide in an amount no less than 0.1 pbw, preferably no less than 0.3 pbw, more preferably no less than 0.5 pbw, most desirably no less than 0.7 pbw, and no more than 10 pbw, preferably no more than 5 pbw, more preferably no more than 3 pbw, most desirably no more than 2 pbw. The resulting golf ball will be poor in hardness, feeling, durability, and rebound resilience if the amount is more or less than specified.

Vulcanization Accelerator

The vulcanization accelerator is generally exemplified by those of guanidine type, aldehyde-amine type, and thiazole type, which are either acidic or basic. The one used in the present invention is hexamethylenetetramine, which is a basic accelerator of aldehyde-amine type.

The base rubber (100 pbw) should be incorporated with hexamethylenetetramine in an amount no less than 0.01 pbw, preferably no less than 0.1 pbw, more preferably no less than 0.2 pbw. An amount less than 0.01 pbw is too small to accelerate vulcanization and hence useless for productivity.

Hexamethylenetetramine is commercially available under a trade name of "Nocceler H" (from OUCHI SHINKO CHEMICAL INDUSTRIAL) and "Sanceler H" (from SANSHIN CHEMICAL INDUSTRY CO., LTD.).

Organosulfur Compound

According to the present invention, the base rubber is further incorporated with an organosulfur compound, which is an essential ingredient for good rebound resilience. It is selected from thiophenols, thionaphthols, halogenated thiophenols, and metal salts thereof. Their examples include zinc salts of thiophenols (such as pentachlorothiophenol, pentafluorothiophenol, pentabromothiophenol, p-chlorothiophenol, and pentachlorothiophenol) and polysulfides having 2 to 4 sulfur atoms, such as diphenylpolysulfide, dibenzylpolysulfide, dibenzoylpolysulfide, dibenzothiazoylpolysulfide, and dithiobenzoylpolysulfide. Of these examples, zinc salt of pentachlorothiophenol and diphenyldisulfide are preferable.

The base rubber (100 pbw) should be incorporated with the organosulfur compound mentioned above in an amount no less than 0.05 pbw, preferably no less than 0.1 pbw, more preferably no less than 0.2 pbw, and no more than 5 pbw, preferably no more than 4 pbw, more preferably no more than 3 pbw, most desirably no more than 2 pbw. When added excessively, it makes the vulcanized rubber soft; when added sparingly, it has no effect on rebound resilience.

Additional Ingredients

The rubber compound according to the present invention may be incorporated with inorganic fillers, such as zinc oxide, barium sulfate, and calcium carbonate. Their amount based on 100 pbw of the base rubber should be no less than 5 pbw, preferably no less than 7 pbw, more preferably no less than 10 pbw, most desirably no less than 13 pbw, and no more than 80 pbw, preferably no more than 50 pbw, more preferably no more than 45 pbw, most desirably no more than 40 pbw. If their amount is more or less than specified above, the resulting golf ball will not have the prescribed weight and rebound resilience.

For the inorganic filler to produce the effect of improving rebound resilience, the content of zinc oxide therein should preferably be no less than 50 wt %, more preferably no less than 75 wt %, and particularly 100 wt %. (In other words, the inorganic filler should be composed entirely of zinc oxide.)

The zinc oxide should preferably have an average particle diameter (measured by air permeability method) no smaller than 0.01 µm, preferably no smaller than 0.05 µm, particularly no smaller than 0.1 µm, and no larger than 2 µm, preferably no larger than 1 µm.

Among additional ingredients is an antioxidant. Typical antioxidants are 2,2'-methylenebis(4-methyl-6-t-butylphenol and 2,2'-methylenebis(4-ethyl-6-t-butylphenol), which are commercially available under a trade name of "Nocrac NS-6" and "Nocrac NS-5", respectively, both from OUCHI SHINKO CHEMICAL INDUSTRIAL. For the resulting golf ball to have adequate rebound resilience and durability, the amount of antioxidant (based on 100 pbw of the base rubber) should be no less than 0 pbw, preferably no less than 0.05 pbw, more preferably no less than 0.1 pbw, most desirably no less than 0.2 pbw, and no more than 3 pbw, preferably no more than 2 pbw, more preferably no more than 1 pbw, most desirably no more than 0.5 pbw.

The above-mentioned rubber compound can be made into the molded rubber material by vulcanization and curing in the usual way that is applied to any known rubber compound for golf balls. Vulcanization may be accomplished at 100° C. to 200° C. for 10 to 40 minutes.

The molded rubber material should have the property that the difference between the hardness (JIS-C) of the surface of the molded material and the hardness (JIS-C) of the center of the molded material is larger than 10, particularly larger than 15, preferably larger than 18, and smaller than 50, particularly smaller than 45, preferably smaller than 40. The thus properly adjusted hardness, in conjunction with the properly selected materials, is essential for the golf ball to have the desired rebound resilience.

The golf ball according to the present invention has the molded rubber material mentioned above as its constituent; however, it is not specifically restricted in its type. In other words, it may be a one-piece golf ball in which the molded rubber material itself functions as the golf ball, a two-piece golf ball which is composed of the molded rubber material as the solid core and a covering layer formed thereon, a three-piece (or multi-piece) golf ball which is composed of the molded rubber material as the solid core and two (or more) covering layers formed thereon, and a thread-wound golf ball in which the molded rubber material is used as the center core. The molded rubber material fully produces its effect when used as the solid core for two-piece or multi-piece golf balls.

In the case where the molded rubber material of the present invention is used as the solid core as mentioned above, the diameter of the solid core should be no smaller than 30.0 mm, preferably no smaller than 32.0 mm, more preferably no smaller than 35.0 mm, most desirably no smaller than 37.0 mm, and no larger than 41.0 mm, preferably no larger than 40.5 mm, more preferably no larger than 40.0 mm, most desirably no larger than 39.5 mm. The diameter of the solid core for the two-piece solid golf ball should be no smaller than 37.0 mm, preferably no smaller than 37.5 mm, more preferably no smaller than 38.0 mm, most desirably no smaller than 38.5 mm, and no larger than 41.0 mm, preferably no larger than 40.5 mm, more preferably no larger than 40.0 mm. The diameter of the solid core for the three-piece solid golf ball should be no smaller than 30.0 mm, preferably no smaller than 32.0 mm, more preferably no smaller than 34.0 mm, most desirably no smaller than 35.0 mm, and no larger than 40.0 mm, preferably no larger than 39.5 mm, more preferably no larger than 39.0 mm.

The solid core mentioned above is not specifically restricted in the amount of deformation under a load which changes from 10 kgf (initial load) to 130 kgf (final load). However, the amount of deformation should be no smaller than 2.0 mm, preferably no smaller than 2.5 mm, and no larger than 7.0 mm, preferably no larger than 5.0 mm. Any solid core incapable of sufficient deformation makes the golf ball spin more than necessary (thereby reducing carry) at the time of long shot causing a large amount of deformation. By contrast, any golf ball subject to excessive deformation has an adverse effect on carry because of poor rebound resilience. The amount of deformation and the hardness are a measure of the same property. The larger the amount of deformation, the smaller the hardness, and vice versa.

The solid core mentioned above should have a specific gravity which is no lower than 0.9, preferably no lower than 1.0, more preferably no lower than 1.1, and no higher than 1.4, preferably no higher than 1.3, more preferably no higher than 1.2.

The molded rubber material of the present invention may be enclosed in any known covering layer and intermediate layer to make two-piece golf balls or multi-piece golf balls. Such covering layers and intermediate layers may be formed from thermoplastic or thermosetting polyurethane elastomer, polyester elastomer, ionomer resin, polyolefin elastomer, and mixtures thereof. They may be used alone or in combination with one another. Of these examples, thermoplastic polyurethane elastomer and ionomer resin are preferable.

The thermoplastic polyurethane elastomer mentioned above may be selected from commercial ones, such as "Pandex T7298, T7295, T7890, TR3080, T8295, and T8290" (from DIC Bayer Polymer Ltd.), which are derived from aliphatic or aromatic diisocyanate. The ionomer resin mentioned above may also be selected from commercial ones, such as "Surlyn 6320 and 8120" (from E.I. du Pont de Nemours & Company) and "Himilan 1706, 1605, 1855, 1601, and 1557" (from DU PONT-MITSUI POLYCHEMICALS CO., LTD.).

The main material for the covering layer may optionally be incorporated with a polymer such as thermoplastic elastomer (excluding the one mentioned above). Examples of the optional polymer include polyamide elastomer, styrene block elastomer, hydrogenated polybutadiene, and ethylene-vinyl acetate copolymer (EVA).

The two-piece (or multi-piece) solid golf ball of the present invention may be produced by any known process which is not specifically restricted. The process for producing the two-piece (or multi-piece) solid golf ball consists of placing the molded rubber material (as the solid core) in the mold for injection molding and forming the covering layer (and the intermediate layer) on the solid core by injection molding. The covering layer may also be formed by pressure molding.

The intermediate layer for the multi-piece solid golf ball should have a thickness no smaller than 0.5 mm, preferably no smaller than 1.0 mm, and no larger than 3.0 mm, preferably no larger than 2.5 mm, more preferably no larger than 2.0 mm, most desirably no larger than 1.6 mm.

The thickness of the covering layer (for both two-piece solid golf balls and multi-piece solid golf balls) should be no smaller than 0.7 mm, preferably no smaller than 1.0 mm, and no larger than 3.0 mm, preferably no larger than 2.5 mm, more preferably no larger than 2.0 mm, most desirably no larger than 1.6 mm.

The multi-piece golf ball of the present invention should conform to the golf play rule. That is, the diameter should be no smaller than 42.67 mm and no larger than 44.0 mm, more preferably no larger than 43.5 mm, most preferably no larger than 43.0 mm. The weight should be no more than 45.93 g, and no less than 44.5 g, preferably no less than 45.0 g, more preferably no less than 45.1 g, most desirably no less than 45.2 g.

The molded rubber material for golf balls according to the present invention is characterized by its high rebound resilience and high quality. It may be used as the solid core for one-piece golf balls and multi-piece solid golf balls. It contributes to initial velocity and carry. In addition, it is capable of efficient production with a rapid crosslinking rate.

EXAMPLES

The invention will be described in more detail with reference to the following Examples and Comparative Examples, which are not intended to restrict the scope thereof.

Examples 1 to 5 and Comparative Examples 1 and 2

Rubber compounds were prepared by kneading or rolling according to the formulations shown in Table 1. Each rubber compound was molded into a spherical molded rubber material by vulcanization at 160° C. for 20 minutes in a spherical mold.

TABLE 1

|  | Example | | | | | Comparative Example | |
|---|---|---|---|---|---|---|---|
|  | 1 | 2 | 3 | 4 | 5 | 1 | 2 |
| Polybutadiene A | 100 | 100 | 100 | 100 | 80 | 100 | 100 |
| Polybutadiene B |  |  |  |  | 20 |  |  |
| Zinc acrylate | 27 | 27 | 27 | 27 | 27 | 27 | 27 |
| Zinc oxide | 18.3 | 18.3 | 18.3 | 18.3 | 18.3 | 18.3 | 18.3 |
| Antioxidant | 0.2 | 0.2 | 0.2 | 0.2 | 0.2 | 0.2 | 0.2 |
| Organic peroxide | 0.4 | 0.4 | 0.4 | 0.4 | 0.4 | 0.4 | 0.4 |
| Zinc salt of pentachlorothiophenol | 1 | 1 | 1 | 1 | 1 | 1 | 1 |
| Hexamethylenetetramine | 0.05 | 0.2 | 1 | 3 | 1 | — | — |
| Zinc stearate |  |  |  |  |  |  | 10 |

In terms of parts by weight.

The ingredients shown in Table 1 were selected from the following commercial products.

Polybutadiene A: "EC140" from The Firestone Polymer Company, polybutadiene rubber polymerized by Nd catalyst. It has a stress relaxation time $T_{80}=2.3$.

Polybutadiene B: "BR01" from JSR Corporation, polybutadiene rubber polymerized by Ni catalyst. It has a stress relaxation time $T_{80}=8.4$.

Zinc acrylate: from NIPPON SHOKUBAI CO., LTD.

Zinc oxide: from Sakai Chemical Industry Co., Ltd., with an average particle diameter of 0.6 μm (measured by air permeation method) and a specific surface area of 3.5 m²/g (measured by BET method).

Antioxidant: 2,2'-methylene-bis(4-methyl-6-t-butylphenol), "Nocrac NS-6" from OUCHI SHINKO CHEMICAL INDUSTRIAL.

Organic peroxide: dicumylperoxide "Percumyl D" from NOF CORPORATION

Hexamethylenetetramine (vulcanization accelerator): "Nocceler H", from OUCHI SHINKO CHEMICAL INDUSTRIAL.

The spherical molded rubber material thus obtained were examined for hardness (or amount of deformation), initial velocity index, and vulcanization rate index in the following manner. The results are shown in Table 2.

Amount of Deformation

The solid core was pressed under a load changing from 98 N (10 kgf) to 1275 N (130 kgf), and the amount of deformation (in mm) was measured.

Initial Velocity Index

The solid core was tested for initial velocity by using an initial velocity meter of the same type as officially approved by USGA. The results are expressed in terms of comparison with the initial velocity (defined as "1") in Comparative Example 1.

Vulcanization Rate Index at 160° C.

The vulcanization rate index is time required for the solid core to acquire a stable value of hardness. It is expressed in terms of relative value, the value in Comparative Example 1 being defined as "1". The smaller the value, the faster the vulcanization reaction and the shorter the time required to reach stable hardness.

TABLE 2

|  | Example | | | | | Comparative Example | |
|---|---|---|---|---|---|---|---|
|  | 1 | 2 | 3 | 4 | 5 | 1 | 2 |
| Outside diameter (mm) | 37.7 | 37.7 | 37.7 | 37.7 | 37.7 | 37.7 | 37.7 |
| Weight (g) | 32 | 32 | 32 | 32 | 32 | 32 | 32 |
| Amount of deformation (mm) | 4.2 | 4.2 | 4.2 | 4.3 | 4.3 | 4.2 | 4.3 |
| Initial velocity index | 1.000 | 1.000 | 0.999 | 0.999 | 0.999 | 1.000 | 0.996 |
| Vulcanization rate index at 160° C. | 0.92 | 0.78 | 0.61 | 0.61 | 0.61 | 1 | 0.67 |

It is noted from Table 2 that the molded rubber material according to the present invention (Examples 1 to 5) are superior to those in Comparative Examples 1 and 2 in vulcanization rate and initial velocity.

Example 6 and Comparative Example 3

Rubber compounds were prepared by kneading or rolling according to the formulations shown in Table 3. Each rubber compound was molded into a spherical molded rubber material by vulcanization at 160° C. for 20 minutes in a spherical mold. The resulting solid core was tested for initial velocity and vulcanization rate in the same way as mentioned above. The results are shown in Table 4.

TABLE 3

|  | Example 6 | Comparative Example 3 |
| --- | --- | --- |
| Polybutadiene A | 100 | 100 |
| Zinc acrylate | 27 | 27 |
| Zinc oxide | 18.3 | 18.3 |
| Antioxidant | 0.2 | 0.2 |
| Organic peroxide | 0.4 | 0.4 |
| Diphenylsulfide | 1 | 1 |
| Hexamethylenetetramine | 1 | — |

In terms of parts by weight.

TABLE 4

|  | Example 6 | Comparative Example 3 |
| --- | --- | --- |
| Outside diameter (mm) | 37.7 | 37.7 |
| Weight (g) | 32 | 32 |
| Amount of deformation (mm) | 4.2 | 4.2 |
| Initial velocity index | 0.996 | 0.996 |
| Vulcanization rate index at 160° C. | 0.64 | 1.03 |

It is noted from Table 4 that the molded rubber material according to the present invention (Example 6) is superior to the one in Comparative Example 3 in vulcanization rate and initial velocity.

The invention claimed is:

1. A molded rubber material for golf balls which is obtained by molding and curing a rubber composition comprising a base rubber, a crosslinking agent, a co-crosslinking agent, and a vulcanization accelerator,
wherein said base rubber is polybutadiene which results from polymerization with the help of a catalyst of rare earth element and has a stress relaxation time ($T_{80}$) no longer than 4 (measured according to ASTM D 1646-96), said vulcanization accelerator is hexamethylenetetramine, and said rubber composition contains an organosulfur compound.

2. The molded rubber material for golf balls as defined in claim 1, wherein said polybutadiene accounts for no less than 50% by weight in base rubber.

3. The molded rubber material for golf balls as defined in claim 1, wherein said catalyst of rare earth element is a neodymium-based catalyst.

4. The molded rubber material for golf balls as defined in claim 1, wherein said hexamethylenetetramine accounts for no less than 0.01 part by weight in 100 parts by weight of the base rubber.

5. The molded rubber material for golf balls as defined in claim 1, which is a spherical body measuring 30 to 42.7 mm in diameter and being subject to flex deformation of 2.0 to 7.0 mm under a load increasing from 98 N (10 kgf) to 1275 N (130 kgf).

6. A golf ball comprising one or more cover layers and a solid core enclosed therein, wherein the solid core is the molded rubber material as defined in any one of claims 1 to 5.

7. A method for producing a molded rubber material for golf balls by molding and curing a rubber composition comprising a base rubber, a crosslinking agent, a co-crosslinking agent, and a vulcanization accelerator,
wherein said base rubber is polybutadiene which results from polymerization with the help of a catalyst of rare earth element and has a stress relaxation time ($T_{80}$) no longer than 4 (measured according to ASTM D 1646-96), said vulcanization accelerator is hexamethylenetetramine, and said rubber composition contains an organosulfur compound.

8. The molded rubber material for golf balls as defined in claim 1, wherein said rubber composition is incorporated with an inorganic filler and an average particle diameter measured by air permeability method of the inorganic filler is no smaller than 0.01 μm and no larger than 2 μm.

9. The molded rubber material for golf balls as defined in claim 1, wherein the difference between the hardness (JIS-C) of a surface of the molded material and the hardness (JIS-C) of a center of the molded material is larger than 10 and smaller than 40.

* * * * *